United States Patent [19]
Fuss et al.

[11] Patent Number: 5,530,504
[45] Date of Patent: Jun. 25, 1996

[54] FILM CARTRIDGE EJECTOR FOR PHOTOGRAPHIC SYSTEM

[75] Inventors: Timothy J. Fuss, Rochester; Donald P. McGinn, Palmyra; Anthony DiRisio, Rochester; Robert L. Kuhn, Jr., Rush, all of N.Y.

[73] Assignee: Eastman Kodak Company, Rochester, N.Y.

[21] Appl. No.: 445,349

[22] Filed: May 19, 1995

[51] Int. Cl.⁶ .................................................... G03B 19/10
[52] U.S. Cl. ........................................... 354/174; 354/275
[58] Field of Search ..................................... 354/174, 275

[56] References Cited

U.S. PATENT DOCUMENTS

| | | | |
|---|---|---|---|
| 3,380,362 | 4/1968 | Winkler et al. | 95/31 |
| 3,543,664 | 12/1970 | Kremp et al. | 95/31 |
| 3,672,279 | 6/1972 | Hackenberg et al. | 95/31 R |
| 5,049,914 | 9/1991 | Dassero | 354/288 |
| 5,142,316 | 8/1992 | Tanii et al. | 354/212 |
| 5,155,514 | 10/1992 | Tamamura | 354/174 |
| 5,159,365 | 10/1992 | Takahashi et al. | 354/21 |
| 5,323,210 | 6/1994 | Richiuso et al. | 354/288 |
| 5,382,992 | 1/1995 | Kawamura et al. | |
| 5,430,515 | 7/1995 | Lawther et al. | |

OTHER PUBLICATIONS

JP5–150342, Patent Abstract of Japan, Noriyasu Kotani, Camera With Ejector, Jun. 18, 1993.

*Primary Examiner*—Monroe H. Hayes
*Attorney, Agent, or Firm*—Sheridan Ross & McIntosh; David A. Howley

[57] ABSTRACT

An ejector mechanism is provided for use in any system which uses photographic film, such as cameras, film development equipment and any other systems designed for film cartridges. One embodiment of the ejector mechanism includes an ejector slide, an ejector slide spring, a trigger lever, a trigger lever spring, a cover plate and a loading chamber. The ejector slide includes a spring hook, a first guide pin, a second guide pin, a trigger lever tab, a trigger lever notch and a film cartridge pin. The trigger lever includes a trigger lever spring attachment, a trigger lever slot, a pawl, a trigger lever head and a trigger control tab. The cover plate includes a ejector spring attachment, a trigger spring hook, a first guide slot and a trigger control ramp. The first guide slot engages the first guide pin attached to the ejector slide to support first guide pin movement along the first guide slot. The first guide slot further includes a latch tab and a latch slot. The loading chamber, which receives a film cartridge endwise, i.e. axially, includes a second guide slot, a trigger lever guide pin and a film cartridge access slot. The second guide slot engages the second guide pin attached to the ejector slide to support second guide pin movement along the second guide slot. The ejector slide spring is positioned on the ejector spring attachment and the spring hook. The trigger lever spring is positioned on the trigger spring hook and the trigger lever spring attachment. The ejector slide and the trigger lever are positioned between the loading chamber and the cover plate.

21 Claims, 12 Drawing Sheets

FILM CARTRIDGE EJECTOR FOR PHOTOGRAPHIC SYSTEM

FIELD OF THE INVENTION

The present invention generally relates to the field of photographic systems, and in particular, a mechanism for ejecting a film cartridge at least part of the way out of a cartridge receiving chamber located in the body of a photographic system.

BACKGROUND OF THE INVENTION

Photographic cameras having a camera body with a loading chamber for receiving a film cartridge endwise, i.e. axially, must have some means to return the film cartridge to the camera user. In conventional cameras, the loading chamber is directly accessible to the camera user by opening the camera door. Consequently, the camera user can easily remove the film cartridge from the loading chamber. However, direct access is not available in cameras receiving the cartridge axially. Typically, the camera door covers the end of the loading chamber. Thus, such cameras do not provide direct access to the cartridge by opening the camera door. Cameras having loading chambers for axially receiving a film cartridge require some means for making the film cartridge accessible to the camera user.

Generally, the film cartridge is made accessible to the camera user by ejecting the cartridge out of the loading chamber. For example, U.S. Pat. No. 5,049,914 by Dassero, assigned to Eastman Kodak Company, issued Sep. 17, 1991, discloses a camera having a loading chamber and an ejecting member which pops the film cartridge at least partially out of the chamber when the door covering the opening to the chamber is opened by the camera user. Further example, U.S. Pat. No. 5,323,201 by Richiuso et al., assigned to Eastman Kodak Company, issued Jun. 21, 1994, discloses a camera having a loading chamber for receiving a film cartridge endwise and an ejecting device for pushing the cartridge endwise at least partially out of the chamber.

In order to eject the film cartridge out of the loading chamber, energy must be applied to the cartridge in the direction of the opening of the loading chamber. Generally, energy is applied to the cartridge in the form of a translational spring. For example, U.S. Pat. No. 5,155,514 by Tamamura, assigned to Canon Kabushiki Kaisha, issued Oct. 13, 1992, discloses a cartridge loading chamber having springs which are compressed when the film cartridge is loaded in the chamber and the chamber door is closed. The compressed springs are released when the chamber door is opened, thereby causing the cartridge to be ejected through the opening created by the opening of the chamber door.

A further example is the camera disclosed by U.S. Pat. No. 5,323,201 by Richiuso et al., assigned to Eastman Kodak Company, issued Jun. 21, 1994. The camera disclosed includes an ejecting device which receives the cartridge and a spring which is compressed when the cartridge is seated in the chamber. The ejection device is supported for movement in the direction required to eject the cartridge. When the ejection device is unlatched, the compressed spring forces the ejector slide to move the door open and eject the cartridge from the chamber.

The ejection mechanisms disclosed by the above references impose a undesirable force on the film cartridge when the film cartridge is loaded in the chamber and ready for exposure action. For example, U.S. Pat. No. 5,155,514 by Tamamura, assigned to Canon Kabushiki Kaisha, issued Oct. 13, 1992, discloses a mechanism where the spring is compressed upon the insertion of the film cartridge into the chamber. The spring compression is held by the closed chamber door and is released upon the opening of the chamber door. Further, U.S. Pat. No. 5,323,201 by Richiuso et al., assigned to Eastman Kodak Company, issued Jun. 21, 1994, discloses a mechanism where the spring is compressed upon the insertion of the film cartridge into the chamber. The spring compression is held by the latched chamber door and is released upon the unlatching of the door. In both mechanisms, the spring imposes a force on the film cartridge when the cartridge is seated in the chamber.

The spring used to eject the film cartridge must apply enough force to disengage the film cartridge from the advance/rewind mechanism and eject the film cartridge partially out of the chamber. In this regard, the ejection mechanisms disclosed by the above reference's mechanisms are difficult to control as to the extent of ejection of the film cartridge from the chamber.

In view of the above, it would be desirable to provide a mechanism which has no spring force imposed on a film cartridge while the film cartridge is seated in a loading chamber. It would be advantageous to provide a mechanism to prevent a film cartridge from being ejected too far out of the loading chamber after the film cartridge is lifted off the advance/rewind mechanism. It would be desirable to provide a mechanism which is easily adaptable to other positions in a loading chamber, therefore accommodating a variety of camera configurations. It would be advantageous to provide a mechanism which provides positive feedback to a camera operator when a film cartridge is fully seated in a loading chamber.

SUMMARY OF THE INVENTION

In accordance with the present invention, an ejector mechanism for ejecting a film cartridge partially out of a loading chamber, designed to receive a film cartridge endwise, i.e. axially, is provided which achieves one or more of the above-mentioned objectives. Generally, the ejector mechanism of the present invention is for use in any system which uses photographic film, such as cameras, film development equipment and any other system designed to accept film cartridges.

In one embodiment, the ejector mechanism includes an ejector slide, an ejector slide spring, a trigger lever, a trigger lever spring, a cover plate and a loading chamber. The ejector slide and the trigger lever are positioned between the loading chamber and the cover plate. Using this embodiment of the ejector mechanism, the camera user inserts the film cartridge into the loading chamber. Preferably, the film cartridge first engages a retention tab which prevents the film cartridge from disengaging from the loading chamber without some external force, such as the camera user removing the film cartridge from the loading chamber.

In another embodiment, the film cartridge engages the ejector slide. As a consequence of the further insertion of the film cartridge, the ejector slide spring extends. Eventually, the ejector slide becomes "latched." The force of the extended ejector slide spring causes the ejector slide to remain latched. It should be noted that the force of the extended ejector slide spring is held by the latched ejector slide and removed from the film cartridge. It should also be noted that the latching of the ejector slide provides positive feedback to the camera user that the film cartridge is fully seated and the film door may be closed.

In another embodiment, as the film door is closed, the trigger lever engages the ejector slide and is fully set when the film door is completely closed.

In another embodiment, the film cartridge is ejected by first opening the film door. As the film door opens, the trigger lever engages the ejector slide and causes the ejector slide to become unlatched. As a result, the film cartridge is lifted off the drive spindles and the ejector slide lifts the film cartridge partially out of the loading chamber. Preferably, the retention tab engages the film cartridge thereby preventing the film cartridge from disengaging from the loading chamber without some external force, such as the camera user removing the film cartridge from the loading chamber. It should be noted that the retention tab is a mechanism which prevents the film cartridge from being ejected too far out of the loading chamber.

In another embodiment of the present invention, the ejector slide is unlatched independent of the film door opening. In this embodiment of the ejector mechanism, the ejector mechanism can be used in conjunction with the differential gear mechanism disclosed in the commonly assigned application entitled DIFFERENTIAL GEAR FOR MOTOR DRIVEN PHOTOGRAPHIC SYSTEM.

DETAILED DESCRIPTION

An ejector mechanism according to the present invention is for use in any system which uses photographic film, such as cameras, film development equipment and equipment which allow the viewing and/or printing of processed film contained within a film cartridge. Preferably, the ejector mechanism is used in photographic systems.

Figure 1:
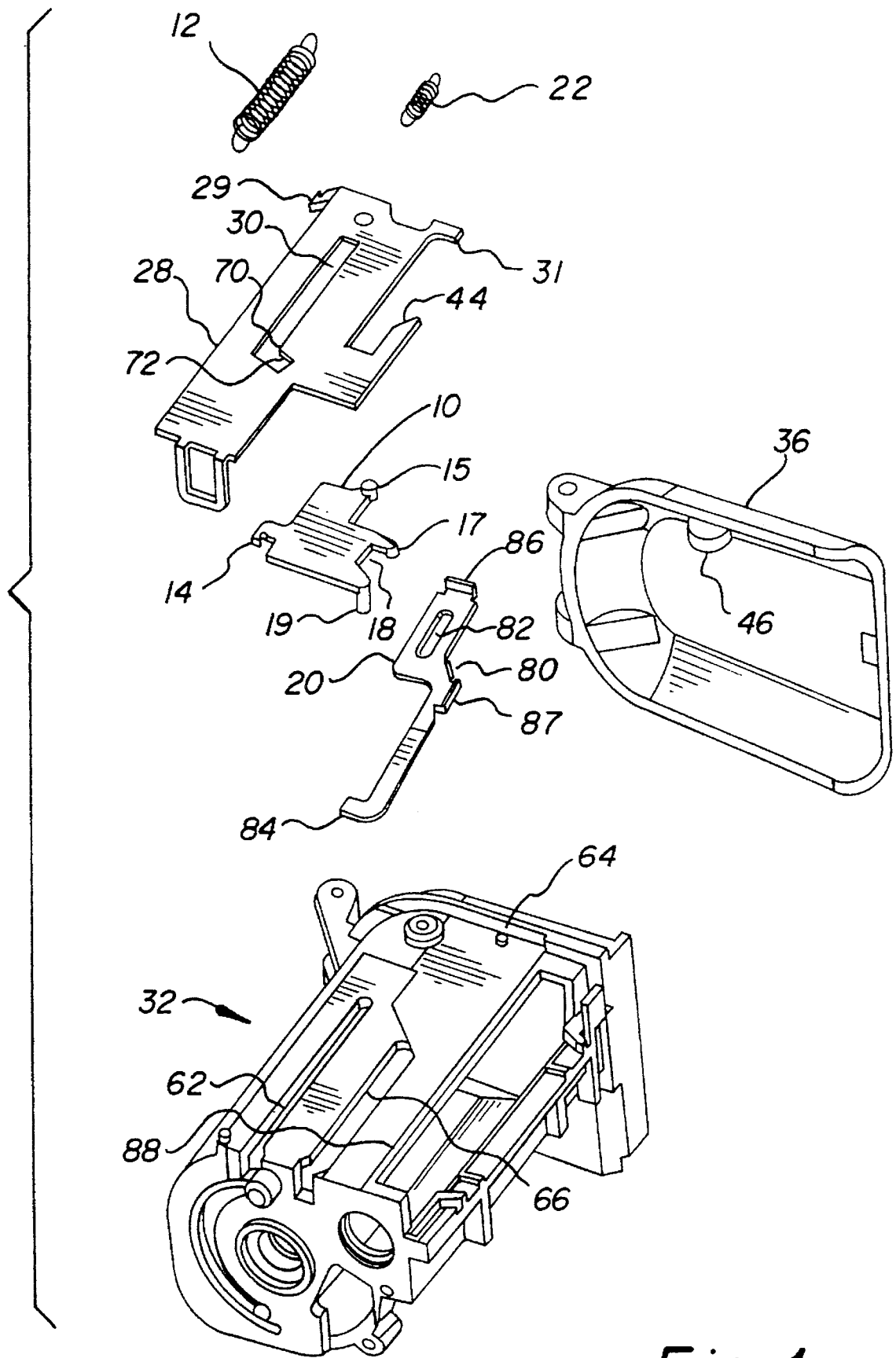
FIG. 1 is an exploded perspective view of one embodiment of the ejector mechanism according to the present invention.
Figure 2:
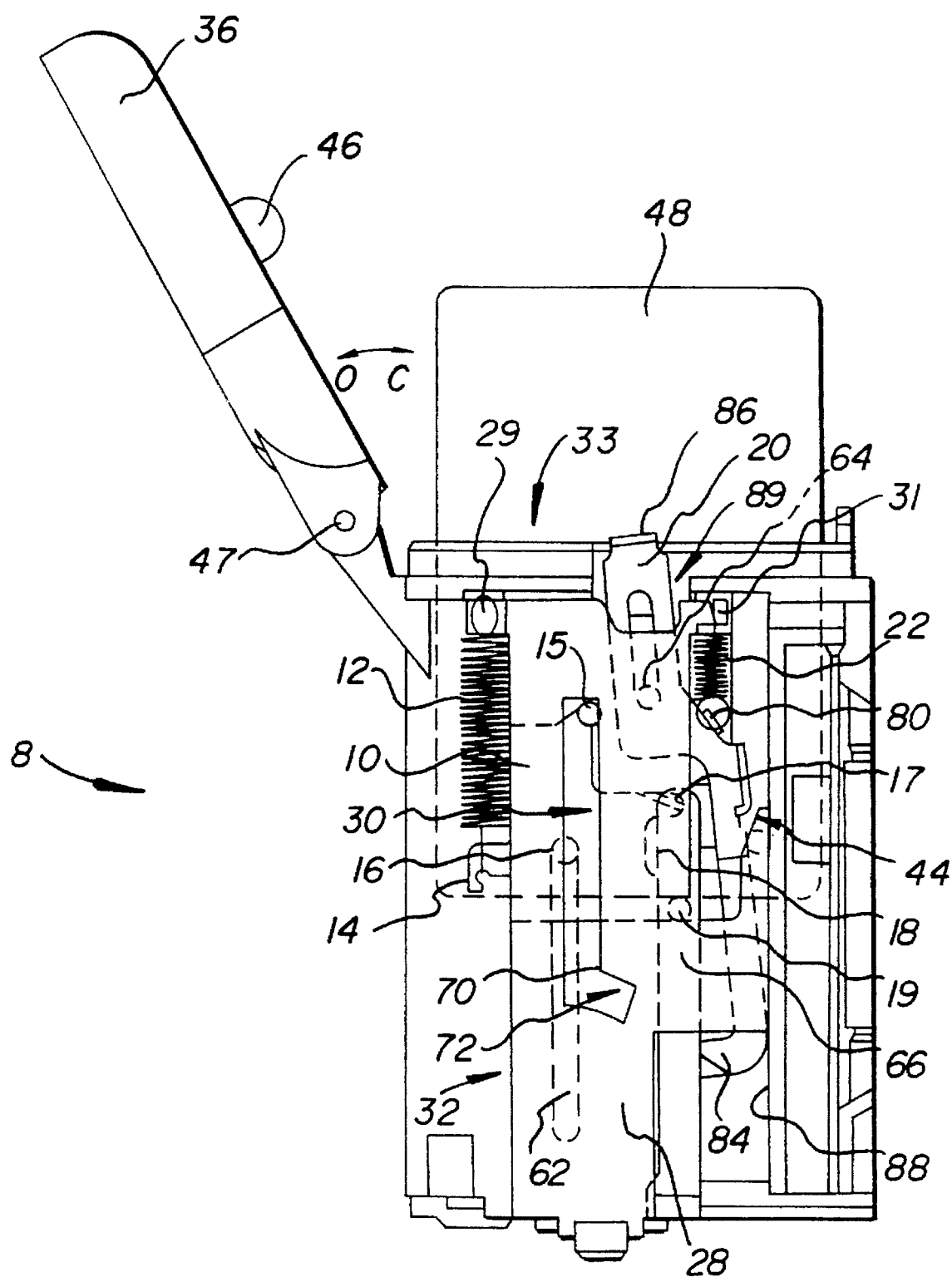
FIG. 2 is a side view of the components of the ejector mechanism shown in FIG. 1 showing the film cartridge engaging the film cartridge pin and before the ejector slide spring is extended.
Figure 3:
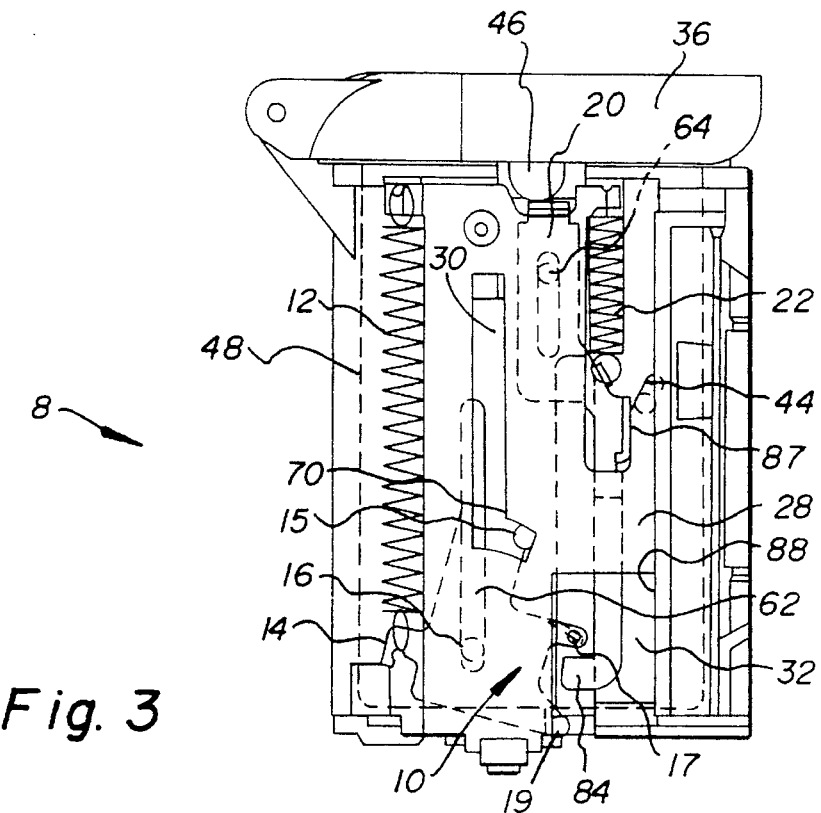
FIG. 3 is a side view of the components of the ejector mechanism shown in FIG. 1 showing the ejector slide latched and the camera door closed.

One embodiment of the present invention is shown in FIGS. 1–6. An ejector mechanism 8 is shown with a loading chamber 32 for receiving a film cartridge 48 endwise, i.e. axially, through the opening 33 and into the interior of the loading chamber 32. Preferably, the film cartridge 48 is a thrust film cartridge. More preferably, the film cartridge 48 includes a notched disk (not shown) secured to one end of a film spool indicating whether the film (not shown) contained within the film cartridge 48 has been exposed or processed. The notch in the disk is positioned in a first orientation when the film contained within the film cartridge 48 has been processed or exposed, and in a second orientation when the film has not been processed or exposed. The film door 36, which includes a tab 46, seals the loading chamber 32 as shown in FIG. 3, and is supported for pivotal opening and closing movement in the opposite directions O and C as shown in FIG. 2, via a pivot pin 47.

Figure 5:
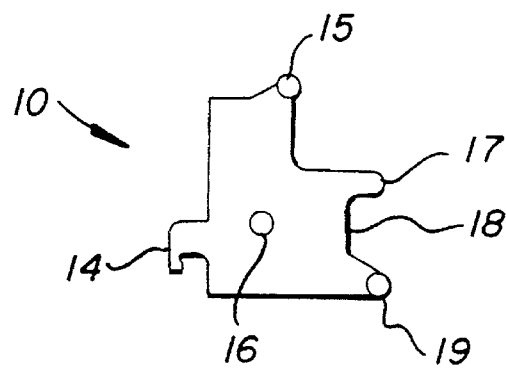
FIG. 5 is a side view of the ejector slide component of the ejector mechanism shown in FIG. 1.
Figure 6:
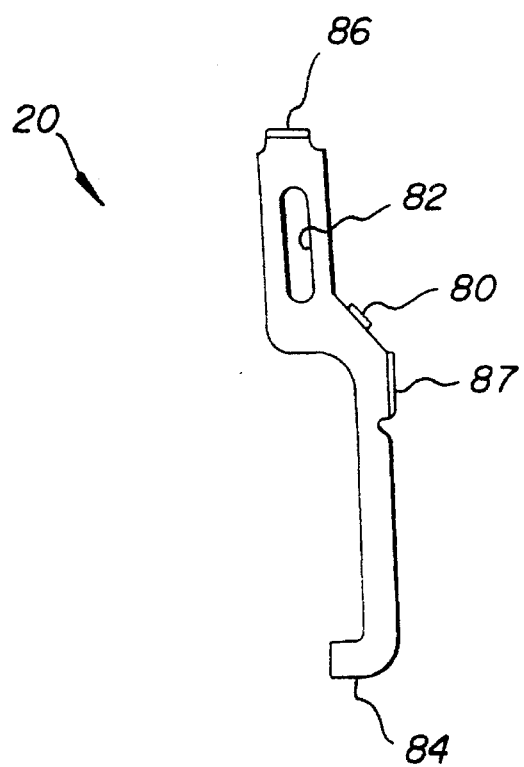
FIG. 6 is a side view of the trigger lever component of the ejector mechanism shown in FIG. 1.

The ejector mechanism 8 generally includes an ejector slide 10, an ejector slide spring 12, a trigger lever 20, a trigger lever spring 22, a cover plate 28 and a loading chamber 32. As shown in FIG. 5, the ejector slide 10 includes a spring hook 14, a first guide pin 15, a second guide pin 16, a trigger lever tab 17, a trigger lever notch 18 and a film cartridge pin 19. As shown in FIG. 6, the trigger lever 20 includes a trigger lever spring attachment 80, a trigger lever slot 82, a pawl 84, a trigger lever head 86 and a trigger control tab 87.

As shown in FIG. 1, the cover plate 28 includes a ejector spring attachment 29, a trigger spring hook 31, a first guide slot 30 and a trigger control ramp 44. The first guide slot 30 engages the first guide pin 15 attached to the ejector slide 10 to support first guide pin 15 movement along the first guide slot 30. The first guide slot further includes a latch point 70 and a latch slot 72. The loading chamber 32 includes a second guide slot 62, a trigger lever guide pin 64, a film cartridge access slot 66 and a trigger lever retaining wall 88. The second guide slot 62 engages the second guide pin 16 attached to the ejector slide 10 to support second guide pin 16 movement along the second guide slot 62. Preferably, the second guide pin 16 is positioned within the second guide slot 62 to allow the ejector slide 10 to rotate about the second guide pin 16.

For ease of description, the ejector mechanism 8 is described below as it relates to film cartridge insertion, film door closing and film cartridge ejection.

Film Cartridge Insertion

Figure 7:
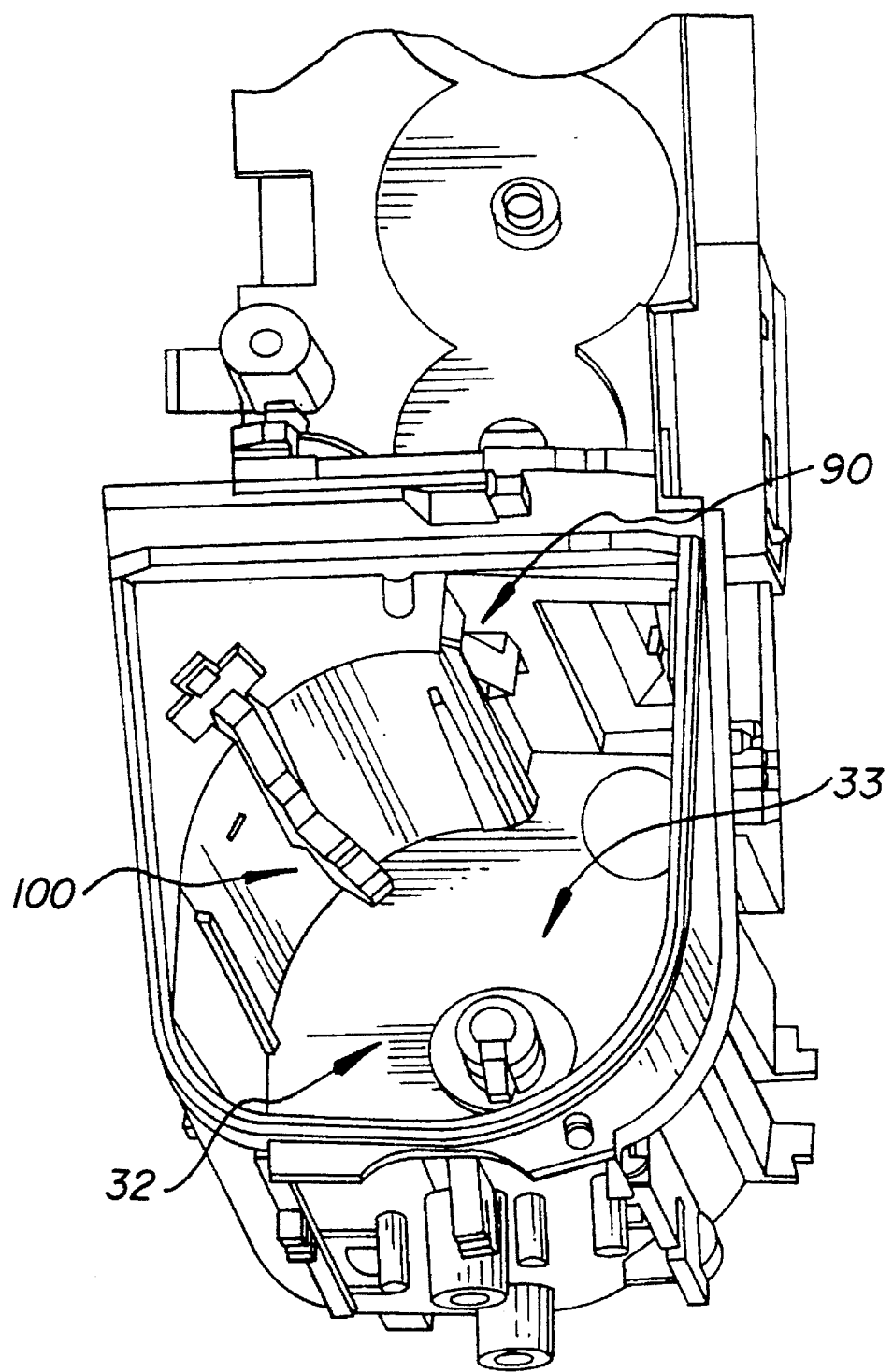
FIG. 7 is a perspective view into the loading chamber showing the hook and retention tab components.

FIG. 2 shows the components of the ejector mechanism 8 where the film cartridge 48 initially contacts the film cartridge pin 19 of the ejector slide 10 and before the ejector slide spring 12 is extended. As shown in FIG. 2, the ejector slide spring 12 is positioned on the ejector spring attachment 29 and the spring hook 14. The trigger lever spring 22 is positioned on the trigger spring hook 31 and the trigger lever spring attachment 80. The ejector slide 10 and the trigger lever 20 are positioned between the loading chamber 32 and the cover plate 28. FIG. 7 shows the interior of the loading chamber 32 through the opening 33.

With reference to FIGS. 2 and 7, the camera user inserts the film cartridge 48 by first aligning the film cartridge 48 with the loading chamber 32 and inserting the film cartridge 48 into the loading chamber 32. Preferably, as the film cartridge 48 is inserted into the loading chamber 32, a projection (not shown) on the film cartridge lip temporarily engages a retention tab 90 which temporarily deflects away from the interior of the loading chamber 32 as the film cartridge 48 is inserted further into the loading chamber 32. Preferably, the retention tab 90 is biased to the interior of the loading chamber 32 under the force of a spring (not shown). Thus, preferably, the retention tab 90 prevents the film cartridge from unintentionally falling out of the cartridge chamber by engagement with the projection on the cartridge lip. As will be better appreciated in connection with film cartridge ejection operation, interaction of tab 90 with the cartridge lip projection prevents the film cartridge 48 from disengaging from the loading chamber 32 without some external force, such as the camera user removing the film cartridge 48 from the loading chamber 32.

Preferably, the film cartridge 48 next encounters a hook 100. If the preferred film cartridge 48 is used, the film cartridge 48 is prevented from further insertion into the loading chamber 32 by hook 100 if the disk on one end of the cartridge spool (described above) is oriented such that the hook engages the disk notch. If the disk is oriented such that the notch does not engage the hook (or the film cartridge 48 does not have a notched disk), the film cartridge 48 deflects the hook 100 away from the interior of the loading chamber 32 as the film cartridge 48 is further inserted. Preferably, the hook 100 is biased to the interior of the loading chamber 32 under the force of a spring (not shown).

It should be noted that the presence of the retention tab 90 and the hook 100 are preferred, but not required. Regardless of the presence, or absence, of the retention tab 90 and/or the hook 100, the film cartridge 48 next encounters the ejector slide 10. With reference to FIG. 2, the film cartridge 48 engages the film cartridge pin 19, which protrudes into the interior of the loading chamber 32 through the film cartridge access slot 66. At the point of engagement, resistance to further insertion of the film cartridge 48 is felt due to the tension of the ejector slide spring 12. As a consequence of the further insertion of the film cartridge 48, the ejector slide spring 12 extends. As a result of the film cartridge 48 engaging the film cartridge pin 19 and extending the ejector slide spring 12, a torque biases the ejector slide 10 to rotate clockwise about the second guide pin 16.

FIG. 3 shows the components of the ejector mechanism where the ejector slide 10 is latched, the film spool cartridge 48 is fully within in the loading chamber 32 and the camera door 36 is closed. With reference to FIGS. 2 and 3, as the film cartridge 48 is further inserted into the loading chamber 32, the first guide pin 15 eventually encounters the latch point 70. Because of the torque bias on the ejector slide 10, the first guide pin 15 enters the latch slot 72 and precedes to crawl to the end of the latch slot 72 as the ejector slide 10 rotates about the second guide pin 16. It should be appreciated that when the first guide pin 15 encounters the latch point 70, the film cartridge 48 engages the film cartridge pin 19. As the first guide pin 15 crawls to the end of the latch slot 72, the ejector slide 10 rotates clockwise and, as a result, the film cartridge pin 19 moves away from the film cartridge 48. This ejector slide 10 position is referred to as the ejector slide 10 being "latched." The force of the extended ejector slide spring 12 causes the ejector slide 10 to remain latched.

Preferably, the ejector slide 10 is latched just before the film cartridge 48 is fully seated (i.e. the film spool (not shown) engages a drive spindle (not shown)) in the loading chamber 32 to insure that the ejector is fully latched. It should be appreciated that the force of the extended ejector slide spring 12 is held by the latched ejector slide 10 and is therefore removed from the film cartridge 48. It should also be appreciated that the latching of the ejector slide 10 provides positive feedback to the camera user that the film cartridge 48 is fully seated and the film door 36 may be closed.

Film Door Closing

With reference to FIGS. 2 and 3, once the ejector slide 10 is latched, the camera user next closes the film door 36. Initially, the trigger lever head 86 protrudes above the loading chamber 32 through a trigger lever opening 89. As the film door 36 is closed, the film door tab 46 contacts the trigger lever head 86 and depresses the trigger lever 20, thereby causing the trigger lever spring 22 to extend. As a result of the film door tab 46 contacting the trigger lever head 86 and the extended trigger lever spring 22, a torque biases the trigger lever 20 to rotate counter clockwise about the trigger lever guide pin 64. The trigger lever 20 is prevented from rotating due to the trigger lever 20 engaging the trigger lever retaining wall 88. This position of the trigger lever 20 is referred to as the "retracted" position.

As the trigger lever 20 is further depressed, the trigger lever 20 remains in the retracted position and the pawl 84 becomes level with the trigger lever tab 17. Eventually, the trigger control tab 87 contacts the trigger control ramp 44 on the cover plate 28, thereby causing the trigger lever 20 to rotate clockwise about the trigger lever guide pin 64. As a consequence, the pawl 84 rides up and over the trigger lever tab 17 and into the trigger lever notch 18. This position of the trigger lever 20 is referred to as the "unretracted" position. The trigger lever 20 is fully set when the film door 36 is completely closed. Preferably, a spring loaded collar (not shown) is located on the film door 36 which contacts the film spool (not shown) when the film door 36 is closed, to insure that the film cartridge 48 is fully seated in the loading chamber 32.

Film Cartridge Ejection

Figure 4:
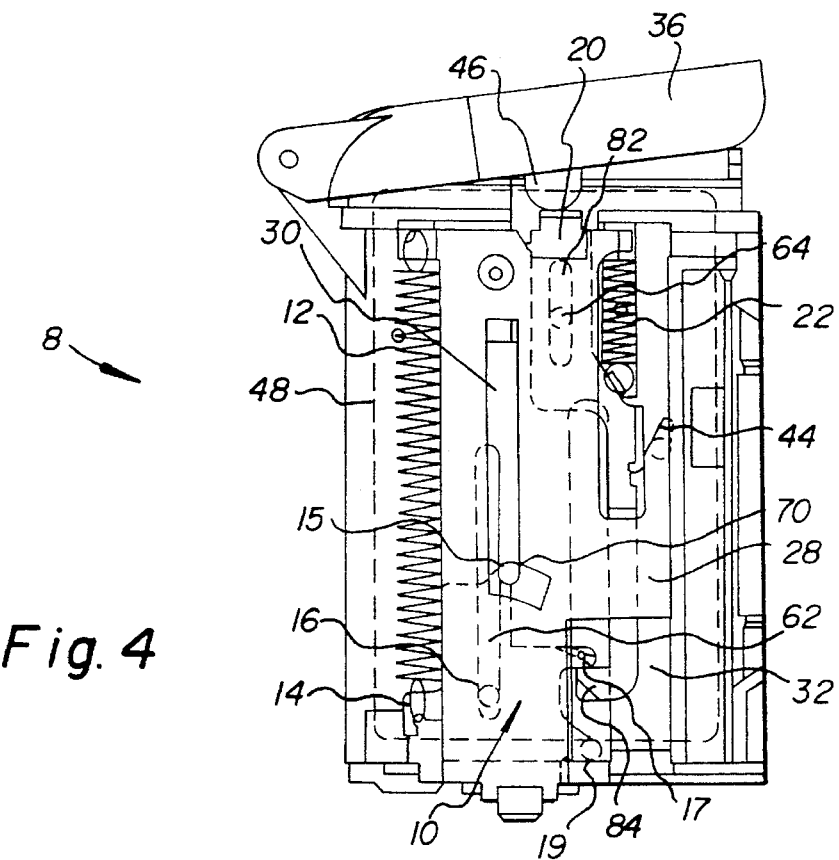
FIG. 4 is a side view of the components of the ejector mechanism shown in FIG. 1 after the film door is opened.

The camera user initiates ejecting the film cartridge 48 by first opening the film door 36. FIG. 4 shows the components of the ejector mechanism 8 where the film door 36 is initially opened. With reference to FIGS. 3 and 4, as the film door 36 opens, the trigger lever 20, under the urging of the extended trigger lever spring 22, pushes the film door 36 further open via the trigger lever head 86 contacting the film door tab 46. Further, as the trigger lever 20 is urged up by the extended trigger lever spring 22, the pawl 84 engages the trigger lever tab 17 and causes the ejector slide 10 to become unlatched. Specifically, the force of the trigger lever spring 22 causes the pawl 84 to engage and lift the trigger lever tab 17, thereby causing the ejector slide 10 to rotate counter clockwise about the second guide pin 16. As a consequence, the first guide pin 15 moves out of the latch slot 72.

As a result of the ejector slide 10 becoming unlatched, the film cartridge 48 becomes unseated (i.e. the film spool (not shown) is lifted off the drive spindle (not shown)) and, under the urging of extended ejector slide spring 12, the ejector slide 10 lifts the film cartridge 48 partially out of the loading chamber 32. As noted above, the retention tab 90 engages a projection on the lip of the film cartridge 48 thereby inhibiting the film cartridge 48 from being removed from chamber 32. The lip projection on the film cartridge 48 prevents the film cartridge 48 from completely ejecting from the loading chamber 32 without some external force, such as the camera user removing the film cartridge from the loading chamber 32. It should be appreciated that the retention tab 90 is a mechanism which prevents the film cartridge 48 from being ejected too far out of the loading chamber 32.

Preferably, the film cartridge 48 includes a projection (not shown) on the cartridge lip which engages the retention tab 90 as the film cartridge 48 is lifted out of the loading chamber 32 by the ejector slide 10 under the urging of the ejector slide spring 12. More preferably, the tension on the ejector slide spring 12 causes the ejector slide 10 to lift the film cartridge 48 out of the loading chamber 32 to a point just before the projection (not shown) engages the retention tab 90. In either preferred circumstance, after engaging the projection (not shown), the retention tab 90 deflects away from the interior of the loading chamber 32 as the film cartridge 48 is lifted out. As the film cartridge 48 is further lifted out of the loading chamber 32, the hook 100 and the retention spring 90 deflect back into the interior of the loading chamber 32.

As noted above, as a result of the film door tab 46 contacting the trigger lever head 86 and the extended trigger lever spring 12, a torque biases the trigger lever 20 to rotate counter clockwise about the trigger lever guide pin 64. Thus, as the trigger lever head 86 further opens the film door tab 46, the trigger control tab 87 no longer contacts the trigger control ramp 44 on the cover plate 28. As a result, the trigger lever 20 rotates counter clockwise about the trigger lever guide pin 64 and moves back to the retracted position.

Figure 8:
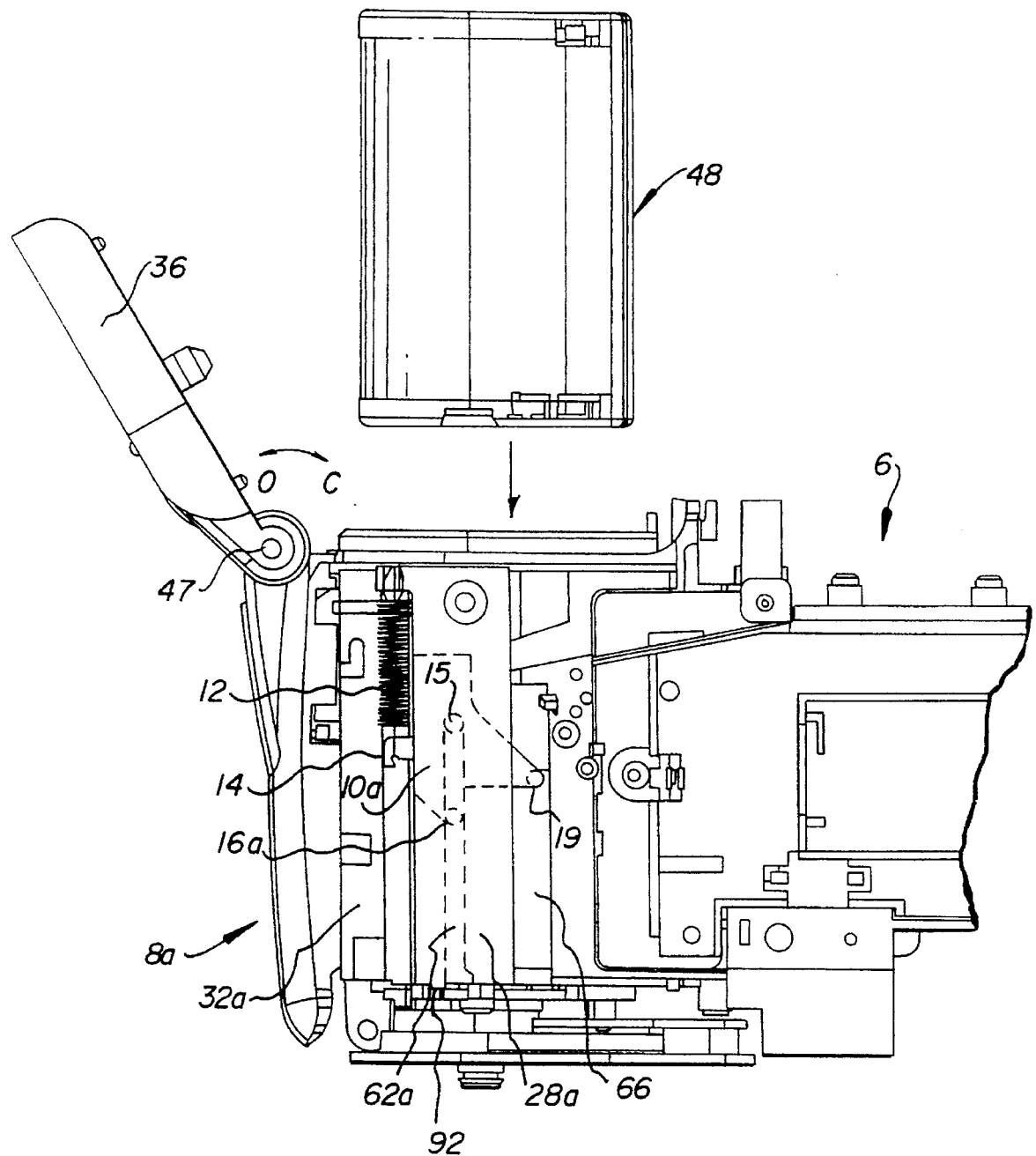
FIG. 8 is a side view of an alternative embodiment of the present invention showing the components of the ejector mechanism prior to the insertion of the film cartridge.
Figure 9:
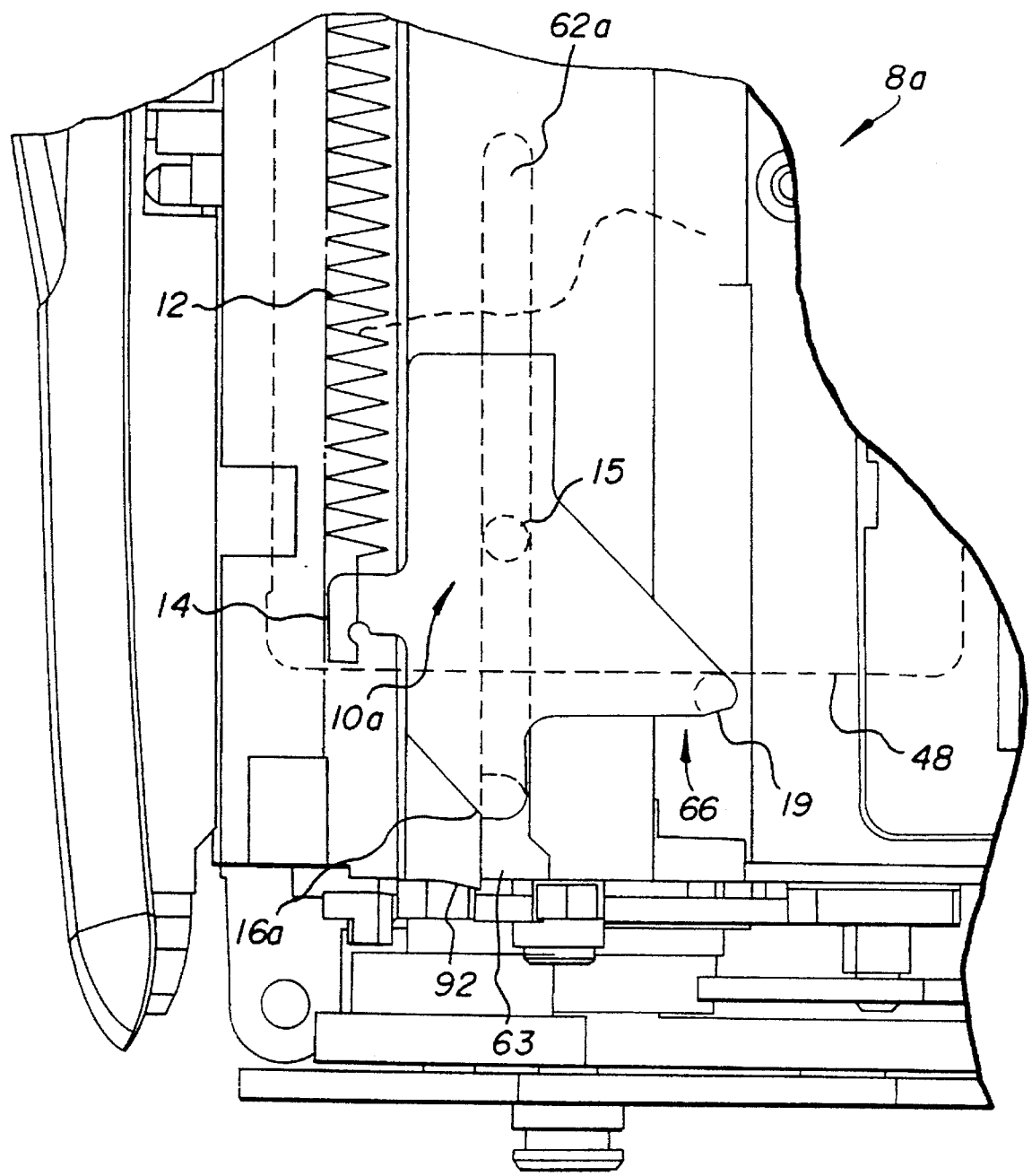
FIG. 9 is a close-up side view of the components of the ejector mechanism shown in FIG. 8 where the film cartridge engages the film cartridge pin on the ejector slide.

Another embodiment of the present invention is shown in FIGS. 8–12. The ejector mechanism 8a is shown as an end portion of a camera body 6 with a loading chamber 32a for receiving a film cartridge 48 axially. The film door 36 seals the loading chamber 32 as shown in FIG. 9, and is supported for pivotal opening and closing movement in the opposite directions O and C as shown in FIG. 8, via a pivot pin 47.

The ejector mechanism 8a generally includes an ejector slide 10a, an ejector slide spring 12, a cover plate 28a and a loading chamber 32a. The ejector slide 10a includes a spring hook 14, a first guide pin 15, a second guide pin 16a and a film cartridge pin 19. The cover plate 28a includes a ejector spring attachment 29. The loading chamber 32a includes a second guide slot 62a and an ejector slide latch 92. As shown in FIG. 8, the second guide slot 62a engages the first guide pin 15 and second guide pin 16a to support ejector slide 10 movement along the direction of the second guide slot 62a.

For ease of description, the ejector mechanism 8a is described below as it relates to film cartridge insertion and film cartridge ejection.

Film Cartridge Insertion

FIG. 8 shows the components the ejector mechanism 8a ready to receive a film cartridge 48. FIG. 9 shows a close-up of the ejector mechanism 8a wherein the film cartridge 48 is partially within the loading chamber 32a. The ejector slide spring 12 is positioned on the ejector spring attachment 29 and the spring hook 14. The ejector slide 10a is positioned between the loading chamber 32a and the cover plate 28a.

Preferably, the film cartridge 48 initially engages the retention tab 90 and the hook 100. Reference is made to the above description of the retention tab 90 and the hook 100, and their operation, and is not repeated here.

With reference to FIGS. 8 and 9, upon insertion into the loading chamber 32a, the film cartridge 48 encounters the ejector slide 10a. Specifically, the film cartridge 48 engages the film cartridge pin 19, which protrudes into the interior of the loading chamber 32a through the film cartridge access slot 66. At this point of engagement, resistance to further insertion of the film cartridge 48 is felt due to the tension of the ejector slide spring 12. As a consequence of the further insertion of the film cartridge 48, the ejector slide spring 12 extends. As a result of the film cartridge 48 engaging the film cartridge pin 19 and the extended ejector slide spring 12, a torque biases the ejector slide 10a to rotate clockwise about the first guide pin 15.

Figure 10:
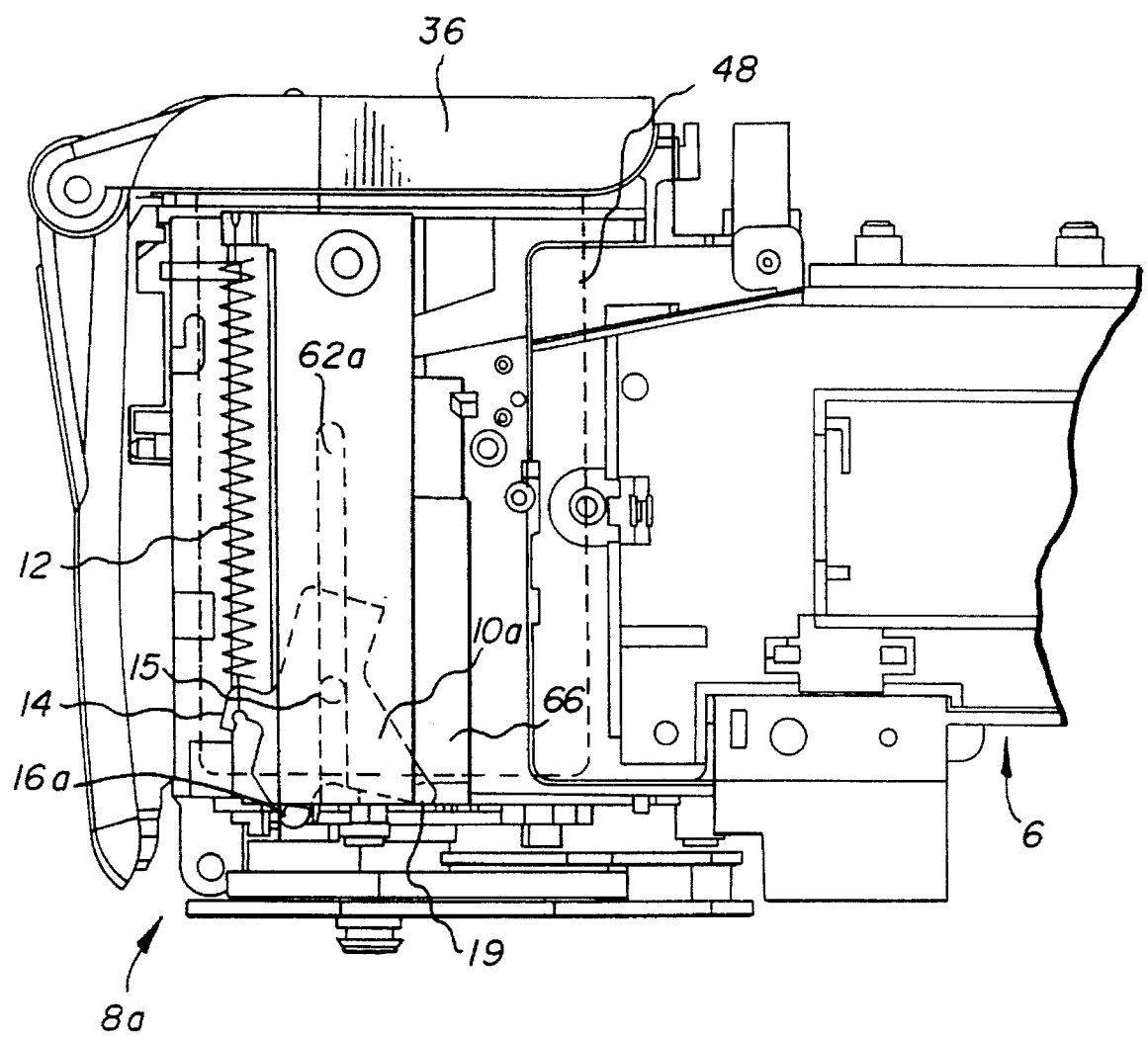
FIG. 10 is a side view of the components of the ejector mechanism shown in FIG. 8 where the ejector slide is latched.
Figure 11:
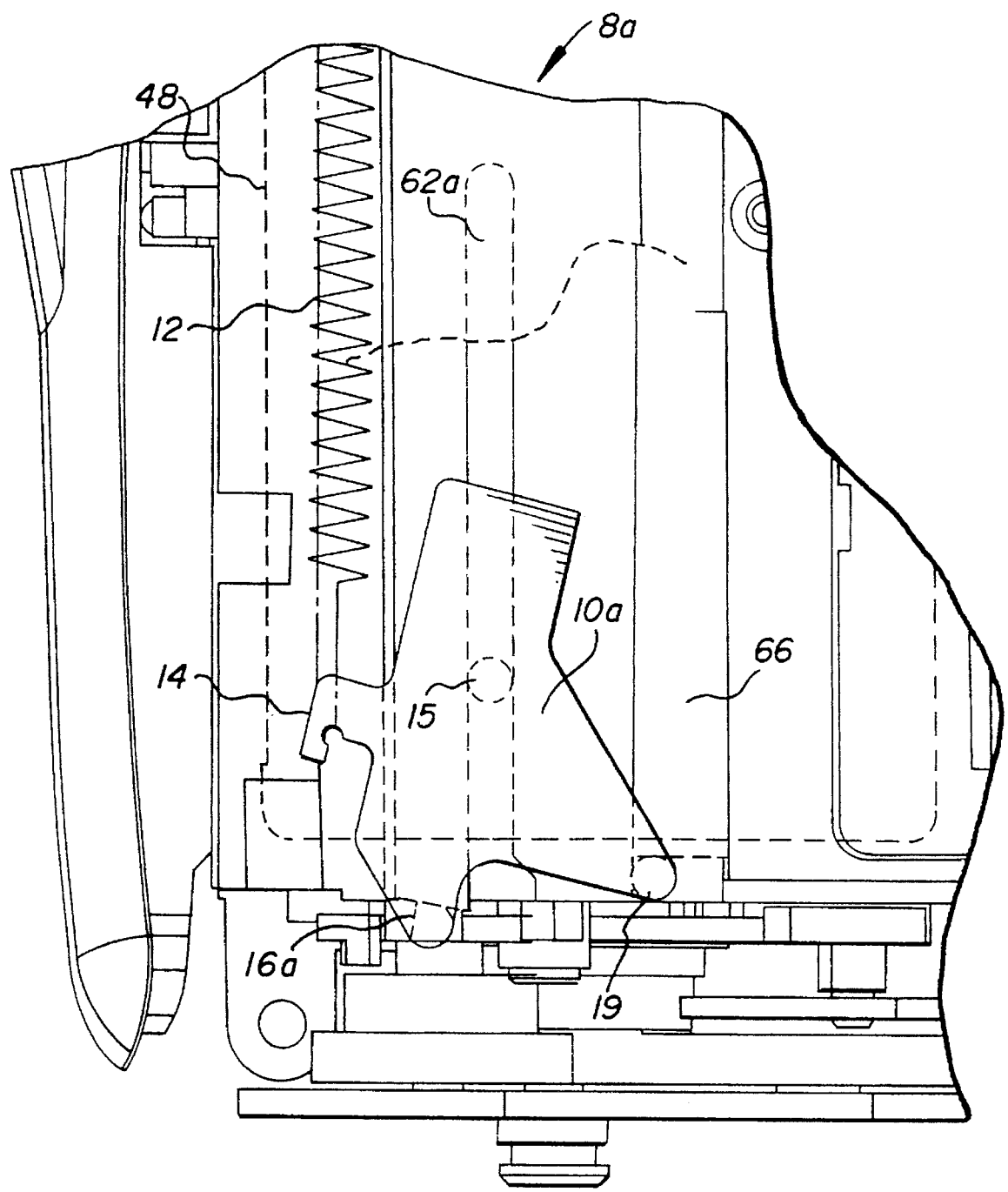
FIG. 11 is a close-up side view of the components of the ejector mechanism shown in FIG. 8 where the ejector slide is latched.

FIGS. 10 and 11 show the components of the ejector mechanism 8a where the ejector slide 10a is latched, the film cartridge 48 is fully within the loading chamber 32a and the film door 36 is closed. With reference to FIGS. 10 and 11, as the film cartridge 48 is further inserted into the loading chamber 32, the second guide pin 16a eventually encounters the opened end 63 of the second guide slot 62a. Because of the torque bias on the ejector slide 10a, the second guide pin 16a engages the ejector slide latch 92 and the ejector slide 10a rotates clockwise about the first guide pin 15. It should be appreciated that when the second guide pin 16a encounters the open end 63, the film cartridge 48 engages the film cartridge pin 19. As the second guide pin 16a engages the ejector slide latch 92, the ejector slide 10 rotates clockwise and, as a result, the film cartridge pin 19 moves away from the film cartridge 48. This ejector slide 10a position is referred to as the ejector slide 10a being "latched." The force of the extended ejector slide spring 12 causes the ejector slide 10a to remain latched.

Preferably, the ejector slide 10a is latched just before the film cartridge 48 is fully seated in the loading chamber 32 to insure that the ejector slide 10a is fully latched. It should be appreciated that the force of the extended ejector slide spring 12 is held by the latched ejector slide 10a and removed from the film cartridge 48. It should be appreciated that the latching of the ejector slide 10a provides positive feedback to the camera user that the film cartridge 48 is fully seated and the film door 36 may be closed.

At this point, the camera user closes the film door 36. Preferably, a spring loaded collar (not shown) is located on the film door 36 which contacts the film spool (not shown) when the film door 36 is closed, to insure that the film cartridge 48 is fully seated in the loading chamber 32a.

Ejecting Film Cartridge

Figure 12:
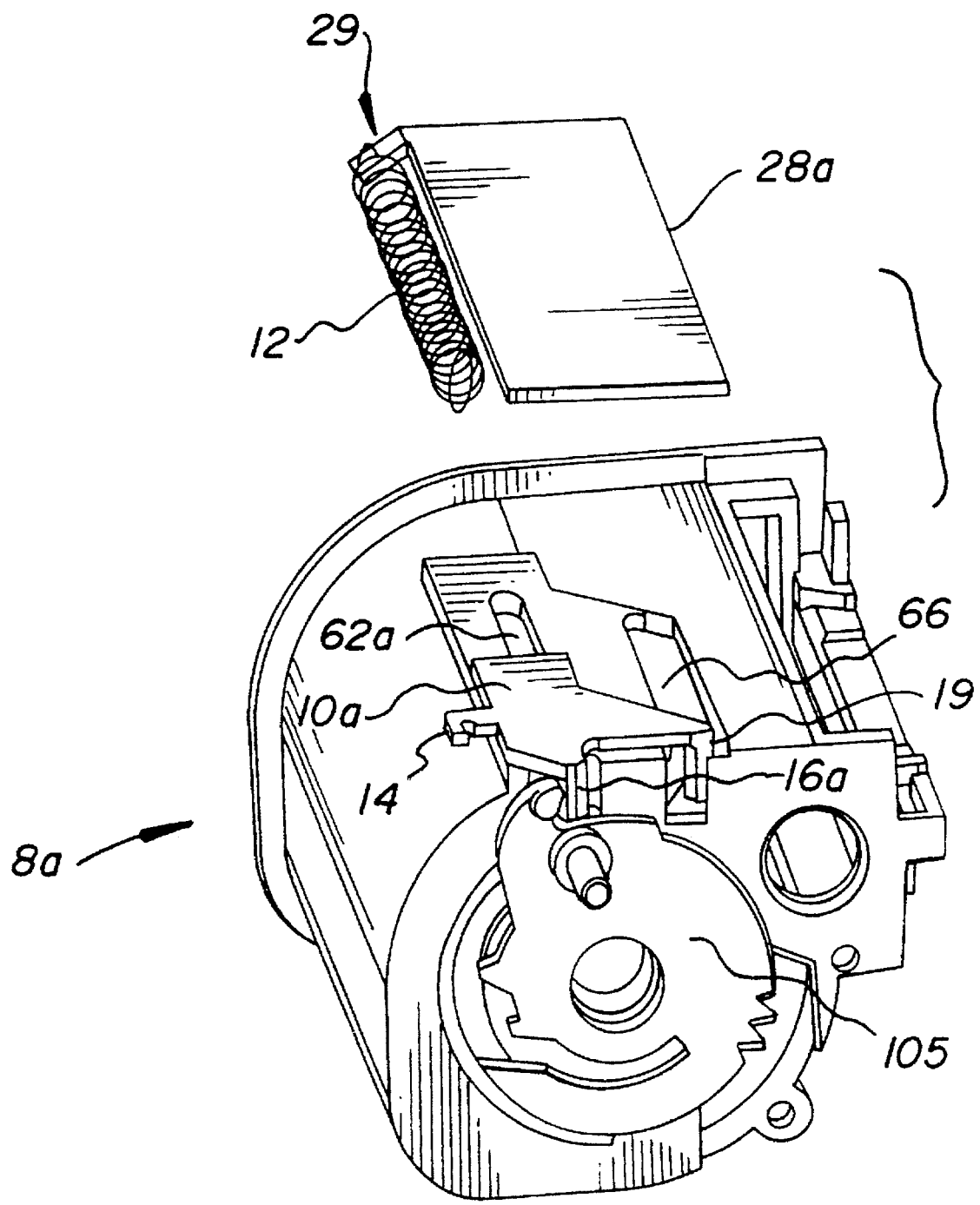
FIG. 12 is a perspective view of the components of the ejector mechanism shown in FIG. 8 also showing a carrier plate.

With regard to the ejector mechanism 8a, ejection of the film cartridge 48 occurs independent of the film door 36 opening. Specifically, a mechanism is required to disengage the second guide pin 16a from the ejector slide latch 92. Preferably, another mechanism used to control other operations, including, for example, advancing and rewinding the film contained within the film cartridge 48, is also used to disengage the second guide pin 16a. More preferably, the ejector mechanism 8a is used in conjunction with a differential gear mechanism 120 as disclosed in the commonly assigned application entitled DIFFERENTIAL GEAR FOR MOTOR DRIVEN PHOTOGRAPHIC SYSTEM and the mechanism used to disengage the second guide pin 16a is a carrier plate 105, as shown in FIG. 12.

Figure 13:
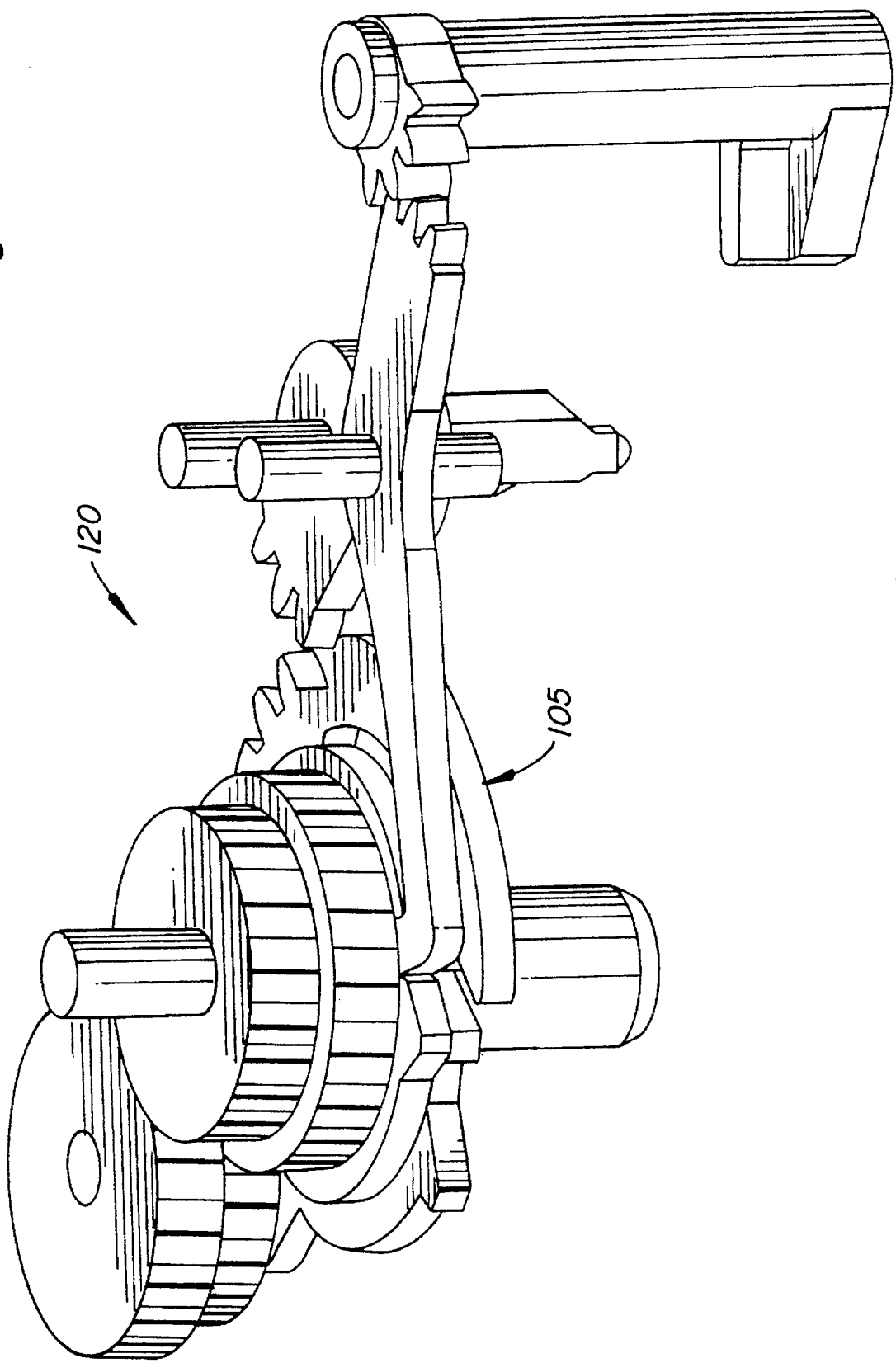
FIG. 13 is a perspective view of a differential gear mechanism described in a commonly assigned application.
Figure 14:
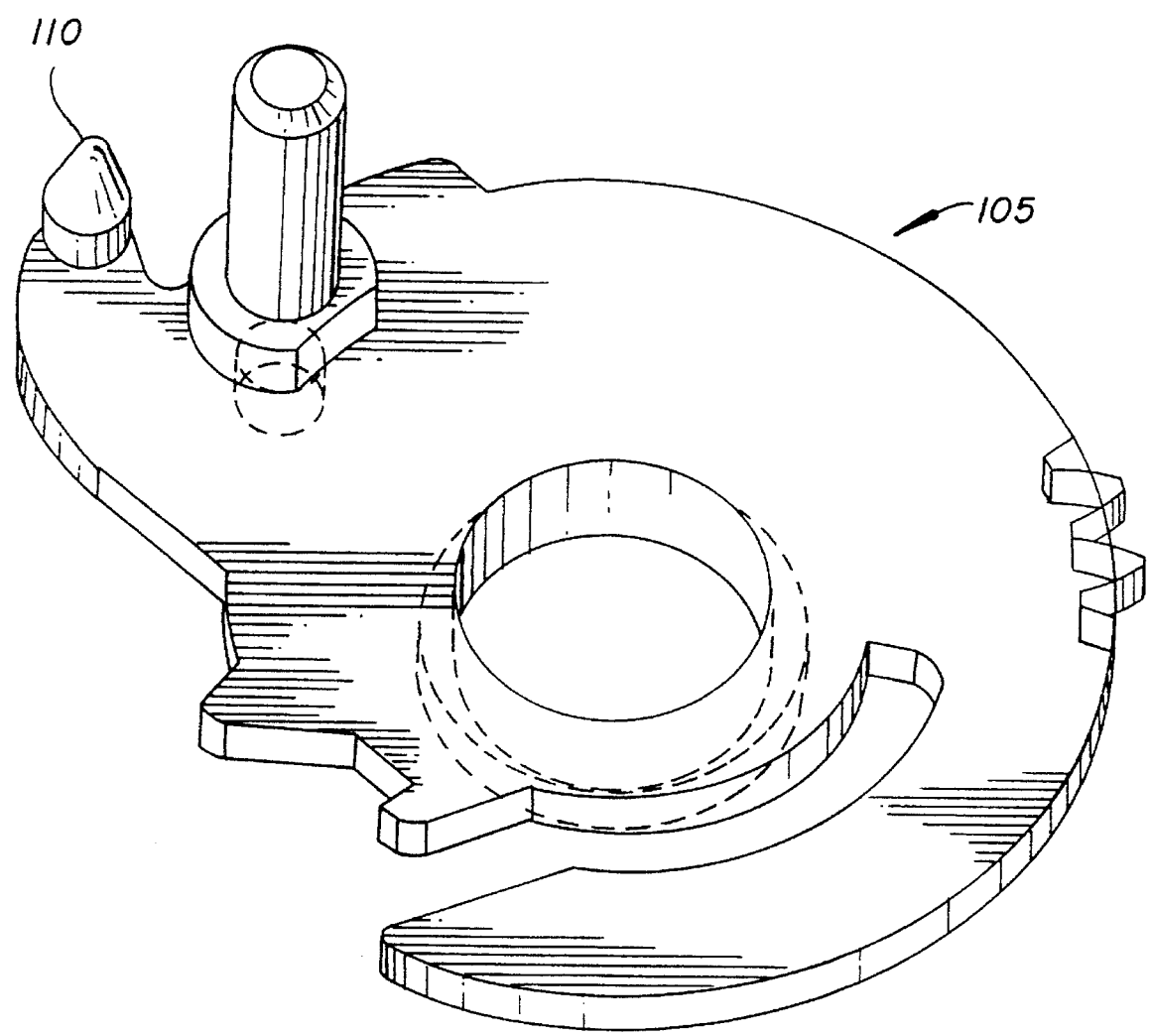
FIG. 14 is a perspective view of a carrier plate which is part of the differential gear mechanism shown in FIG. 13.

As shown in FIG. 13, the differential gear mechanism 120 includes, among other things, a carrier plate 105, which is shown apart from the differential gear mechanism 120 in FIG. 14. As shown in FIG. 14, the carrier plate 105 includes, among other elements, an ejector pin 110.

During operation of the differential gear mechanism, which is described in detail in the commonly assigned application, the carrier plate 105 rotates and eventually, the ejector pin 110 engages the second guide pin 16*a* and causes the second guide pin 16*a* to disengage from the ejector slide latch 92, thereby causing the ejector slide 10*a* to become unlatched.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An ejector mechanism for use in a system adapted to receive a cartridge, said ejector mechanism comprising:
   (a) a loading chamber for receiving a cartridge;
   (b) a door for covering and uncovering said loading chamber;
   (c) an ejection slide for engaging the cartridge when the cartridge is inserted in said loading chamber;
   (d) resilient means for biasing said ejection slide towards the opening of said loading chamber after the cartridge is inserted into said loading chamber;
   (e) means for disengaging the ejector slide from the cartridge after the cartridge is inserted in said loading chamber to remove the biasing force of said resilient means from the cartridge; and
   (f) means for selectively reengaging the ejector slide to the cartridge to apply the biasing force of said resilient means to the cartridge to move the cartridge towards the opening of said loading chamber.

2. An ejector mechanism as claimed in claim 1, wherein the opening of said door causes said ejector slide to reengage the cartridge.

3. An ejector mechanism as claimed in claim 1, wherein said means for reengaging comprises a trigger lever.

4. An ejector mechanism as claimed in claim 1, wherein said resilient means comprises a spring.

5. A photographic camera comprising a camera body with a loading chamber for receiving a film cartridge endwise, a film door for covering and uncovering said loading chamber, and ejection means for ejecting the film cartridge at least partially out of said loading chamber,
   wherein said ejection means further comprises a ejection slide moveable between latched and unlatched positions and a spring for biasing said ejection slide in an ejection direction.

6. A photographic camera as claimed in claim 5, wherein said ejection means further comprises a means for supporting said ejector slide movement in the ejecting direction.

7. A photographic camera as claimed in claim 5, wherein the opening of said film door causes said ejector slide to move from the latched position to the unlatched position and to push the film cartridge at least partially out of the loading chamber.

8. An ejector mechanism for a system adapted to receive and eject a cartridge, said ejector mechanism comprising:
   (a) a loading chamber for receiving a cartridge axially through an opening;
   (b) a door moveable between an open position and a closed position;
   (c) an ejector slide moveable between an unlatched position and a latched position, said ejector slide comprising means for engaging the cartridge when the cartridge is inserted into said loading chamber, wherein when the cartridge is seated, the ejector slide moves from the unlatched position to the latched position;
   (d) a spring for biasing said ejector slide towards said opening of said loading chamber after the cartridge is inserted, wherein the force on the cartridge created by said spring is removed when said ejector slide moves to the latched position;
   (e) latching means for engaging said ejector slide after the cartridge is inserted to cause said ejector slide to move to the latched position; and
   (f) triggering means for selectively moving said ejector slide from a latched position to a unlatched position.

9. An ejector mechanism as claimed in claim 8, wherein said triggering means further comprises a carrier plate.

10. An ejector mechanism as claimed in claim 8, wherein said triggering means further comprises a trigger lever moveable between a retracted position and an unretracted position.

11. An ejector mechanism as claimed in claim 8, wherein said triggering means moves said ejector slide from a latched position to a unlatched position in response to said door moving from an closed position to an open position.

12. An ejector mechanism as claimed in claim 8, wherein said ejector slide further comprises a notch which is engaged by said triggering means when said triggering means is in the unretracted position.

13. An ejector mechanism as claimed in claim 8, wherein said ejector slide further comprises a first pin for engaging said latching means.

14. An ejector mechanism as claimed in claim 13, wherein said latching means comprises a slot, wherein said slot engages said first pin when the ejector slide is in the latched position.

15. An ejector mechanism as claimed in claim 8, wherein said ejector slide further comprises a second pin upon which said ejector slide rotates when said ejector slide moves from the unlatched position to the latched position.

16. An ejector mechanism for a system adapted to receive a cartridge in a loading chamber and eject the cartridge from the loading chamber, the loading chamber having a door moveable between an opened position and a closed position, said ejector mechanism comprising:
   (a) an ejector slide, moveable between a latched and unlatched position;
   (b) an ejector slide spring biasing said ejector slide in the direction of the opening of the loading chamber;
   (c) a trigger lever, moveable between a retracted position and an unretracted position;
   wherein after a cartridge is inserted into the loading chamber, the cartridge moves said ejector slide from the unlatched position to the latched position;
   wherein after the door is moved from the open position to the closed position, the door moves said trigger lever from the retracted position to the unretracted position;
   wherein after the door is moved from the closed position to the open position, said trigger lever moves the ejector slide from the latched position to the unlatched position; and
   wherein after said ejector slide moves from the latched position to the unlatched position, said ejector slide ejects the cartridge partially out of the loading chamber.

17. An ejector mechanism for use in a system adapted to receive a cartridge into a loading chamber, said ejector mechanism comprising:
   (a) first means for applying a biasing force against inserting a cartridge into a loading chamber;
   (b) second means for removing said biasing force after the cartridge has been inserted into the loading chamber; and
   (c) third means for selectively reintroducing said biasing force to the cartridge to eject the cartridge at least partially out of the loading chamber.

18. An ejector mechanism as claimed in claim 17, wherein said first means comprises an ejection slide and an ejection slide spring.

19. An ejector mechanism as claimed in claim 17, wherein said third means comprises a trigger lever.

20. A method for inserting and removing a cartridge to and from a loading chamber, said method comprising the steps of:
   (a) inserting the cartridge into the loading chamber until the cartridge engages an ejector slide;
   (b) applying a force to the cartridge to overcome a biasing force against the further insertion of the cartridge into the loading chamber;
   (c) latching said ejector slide and thereby removing the biasing force on the cartridge; and
   (d) reintroducing the biasing force on the cartridge to eject the cartridge at least partially out of the loading chamber.

21. A method as claimed in claim 20, further comprising the steps of:
   (e) closing a door and thereby causing a trigger lever to move from a retracted position to a unretracted position; and
   (f) opening said door and thereby causing the reintroduction of the biasing force on the cartridge to eject the film cartridge at least partially out of the loading chamber.

* * * * *